United States Patent [19]

Webster

[11] Patent Number: 5,653,333

[45] Date of Patent: Aug. 5, 1997

[54] COMBINED PORTABLE CONTAINER AND DISPLAY STAND

[76] Inventor: John R. Webster, 42 N. Cypress, Clovis, Calif. 93611

[21] Appl. No.: 426,622

[22] Filed: Apr. 20, 1995

[51] Int. Cl.⁶ ..................................................... B65D 5/52
[52] U.S. Cl. ..................... 206/45.2; 206/45.25; 281/33; 281/29
[58] Field of Search .............................. 206/45.2, 45.25; 281/29, 33; 402/72, 76

[56] References Cited

U.S. PATENT DOCUMENTS

| | | | |
|---|---|---|---|
| 4,213,520 | 7/1980 | Sarna et al. | 281/33 |
| 4,240,761 | 12/1980 | Jacobson | 281/33 |
| 4,420,270 | 12/1983 | Rossello | 281/33 |
| 4,765,462 | 8/1988 | Rose, Jr. | 206/45.2 |

Primary Examiner—David T. Fidei
Attorney, Agent, or Firm—Richard A. Ryan

[57] ABSTRACT

A portable container and display stand particularly useful for music educational purposes comprising a plurality of hingedly connected panels made from a single sheet of rigid, lightweight material having a plurality of transverse fold lines. One of the panels is fixed in a folded position and attached to the base panel. Light weight borders form an enclosed container area when the various panels are folded, thereby providing a relatively small, lightweight and portable container for transporting and storing papers or other written materials, such as books, magazines or sheet music. Unfolding the various panels to place the device in a display stand mode is a simple process involving easy manipulation of the top two panels. When unfolded, the device forms a display stand for displaying written material in an easily viewable position.

20 Claims, 2 Drawing Sheets

COMBINED PORTABLE CONTAINER AND DISPLAY STAND

BACKGROUND—FIELD OF THE INVENTION

This invention relates to portable stands for display purposes and more particularly pertains to a combination stand collapsing to a container configuration for storing and transporting display materials. The primary objective is to provide a novel and inexpensive means of carrying, storing, and displaying music for students who wish to practice away from school.

BACKGROUND—DESCRIPTION OF PRIOR ART

Displaying paper related material by use of a portable stand is a common practice in business and education. Easels and stands, particularly music stands, are the most common means of doing this. A wide variety of devises have been invented that provide means for displaying, carrying, or storing loose leaf sheets of paper, books, and like materials. However, relatively few can be found that do all three.

U.S. Pat. No. 2,194,019 to Hartsel (1938) discloses a copyholder with means for storing and displaying loose leaf papers or steno pads for typists. The devise consists of a rectangularly shaped receptacle that converts to an elevated or operative condition when the upper panel of the receptacle is raised pivitally from the base. The inclined position of the panel is maintained by props. A clamp secures the display materials to the display panel. One important limitation on the design is that page turns necessitate the removal of books from the panel.

U.S. Pat. No. 2,889,036 issued to Davies (1959) shows a rectangular box with an interfitting cover that, when removed and inverted, is attached to the box with hinges to make an easel. The front wall of the box has a display window area that is cut out to expose individual sheets of paper from within the box. Although effective in containing paper securely, several limitations exist. First, the opening and closing maneuvers are relatively complex. Secondly, the design allows for loose leaf sheets only which are limited to a certain size to be displayed one at a time from a window with a frame that limits one's view of the documents. And lastly, when opened to easel position, there is no component to keep the base from slipping and possibly causing the display to collapse.

U.S. Pat. No. 3,041,774 to Walker (1962) is a combined Book support and carrier. It also features an added panel that folds out from the base to provide a writing tray. As a carrier, a set of panels and flanges are hinged together and secured by a pair of elastic straps. The straps are also used to secure a book to the device. Conversion from a carrier to a book support condition is achieved by opening the panels and turning the side and base panels into position. An open book is then placed on the front panel. A strap is extended horizontally across the book to secure it to the panel. Several disadvantages are to be noted. First, changing books or pages consists of a relatively involved process with the straps. Secondly, the strap also obscures a portion of the display. Thirdly, the size of the book is limited to the width of the display panel. And, lastly, as noted above with the Davies invention, conversion from a carrier to a display configuration is relatively complex.

U.S. Pat. No. 3,195,850 issued to Steiner (1965) discloses a collapsible, disposable book stand and enclosure. The specification shows that the stand and enclosure are actually two separate structures wherein the enclosure wraps around the stand when it is in a collapsed condition and is removed when the stand is adjusted and raised to an easel condition. The stand is made of a flat piece of foldable material. The folds define panel sections that can be maneuvered into an easel configuration. This device has two primary deficiencies. Particularly as a disposable device, it uses too much material for it's purposes; namely, separate pieces for the stand and the and the enclosure. Secondly, when folded into an easel configuration, the device no longer provides enclosure means for any display materials.

U.S. Pat. No. 5,156,368 to Swanson (1992) discloses a combination music rack and case. The front sidewall of the case, which is formed in the shape of a briefcase, constitutes the display rack. The device provides means allowing the rack to swing into an extended and/or elevated position away from the case. Hinge-like brackets, a support rod and other paraphernalia are included in the design for mounting to a wall. Table top use is generally precluded by the case's relatively small base as well as the top-heavy condition that exists when the rack is elevated and holding display material above the case. The invention is relatively elaborate with, most notably, a sizeable amount of hardware affixed to the case walls which would, of necessity, be made of material substantial enough to receive screws, connecting pins, hinges, bracket, etc. This, coupled with manufacturing time, would make this device too expensive for many customers and far more expensive than any other inventions noted in this document.

OBJECTS AND ADVANTAGES

Accordingly, the objects and advantages of the present invention are:

1. To provide a portable container that can be used to carry and protect papers, books, manuals, and like materials.
2. To provide a combination portable container and display stand that is lightweight, durable, and compact; capable of being folded into a space of such small area that the entire device can be carried in a briefcase, portfolio, or backpack of moderate standard size.
3. To provide a combination portable container and display stand that is relatively inexpensive.
4. To provide a combination portable container and display stand that converts to either collapsed or raised condition with relative ease.
5. To provide a display stand that can be adjusted to a variety of inclinations.
6. To provide a display stand that offers a clear and unobstructed view of the display materials.
7. To provide a display stand that can hold materials that represent a wide range of weights and dimensions—from a single sheet of paper to large books, binders, or posters.

DRAWING FIGURES

Figure 1:
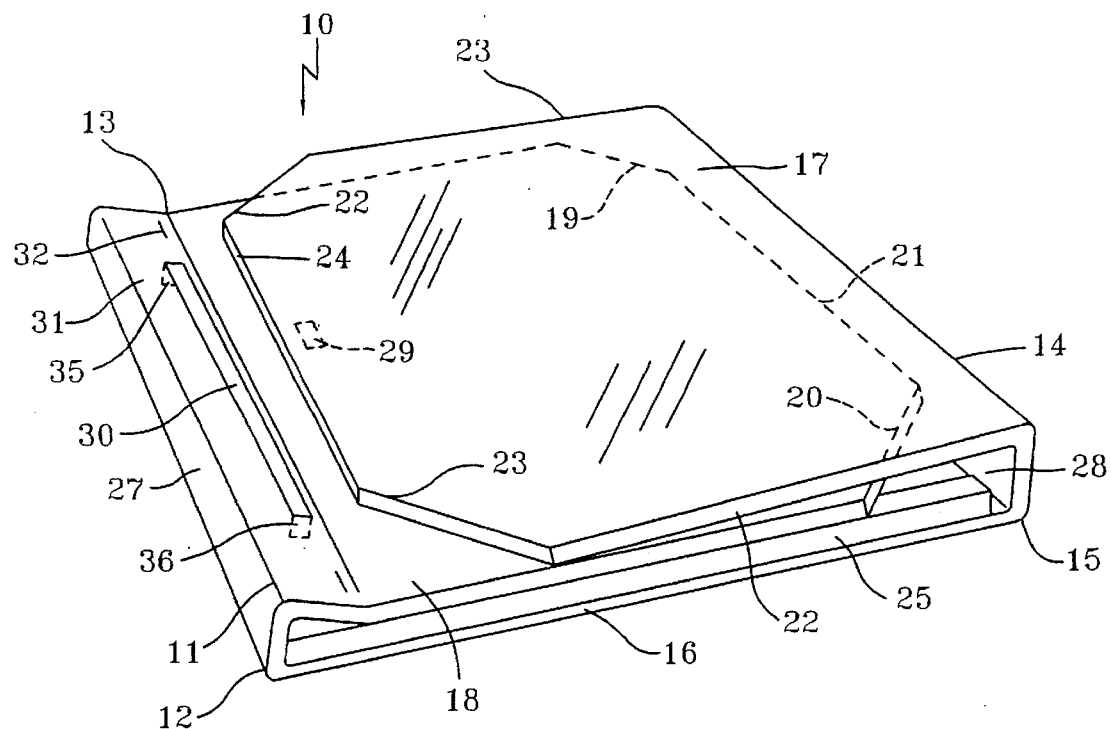
FIG. 1 is a perspective view of the top of the container in a collapsed or folded condition.

| Reference Numerals in the Drawings | |
|---|---|
| 10. Portable container and display stand | 24. End edge (outer Panel) |
| 11. Fold line | 25. Border |
| 12. Fold line | 26. Border |
| 13. Fold line | 27. Front flange |
| 14. Fold line | 28. Rear flange |
| 15. Fold line | 29. Hook and loop fastener |
| 16. Base panel | 30. Prong paper fastener |
| 17. Outer panel | 31. Retaining flange |
| 18. Intermediate panel | 32. Staples |
| 19. Lateral edge (intermediate panel) | 33. Tape |
| 20. Lateral edge (intermediated panel) | 34. Coarse surface tape |
| 21. End edge (intermediate panel) | 35. Spacer |
| 22. Lateral edge (outer panel) | 36. Spacer |
| 23. Lateral edge (outer panel) | |

DESCRIPTION —FIGS. 1 to 4

Figure 4:
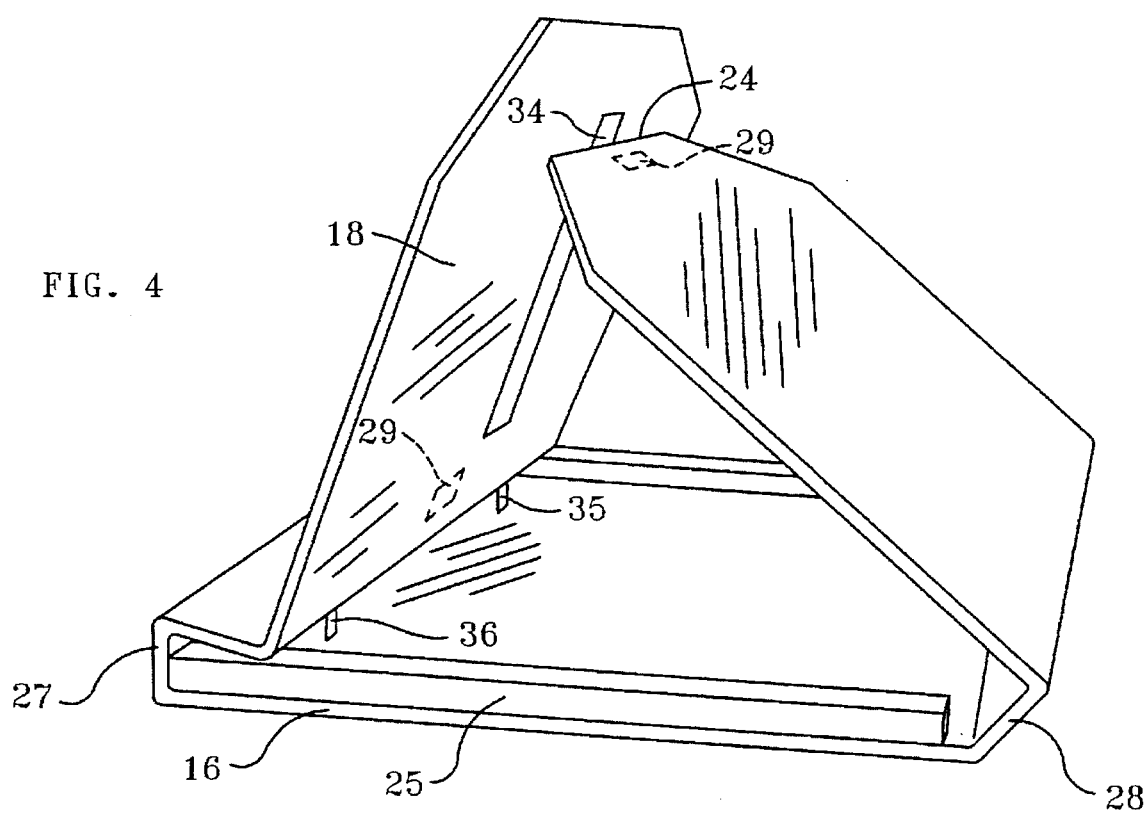
FIG. 4 is a perspective view illustrating additional components of the display stand.

In FIG. 1, present invention 10 is shown in folded or collapsed condition. The illustration discloses a substantially flat piece of stock material, such as cardboard or corrugated paper, with parallel fold lines 11, 12, 13, 14, and 15 which define base panel 16, outer panel 17, intermediate panel 18, front flange 27, rear flange 28, and retaining flange 31; each having substantially parallel lateral edges. Intermediate panel 18 has converging edges 19 and 20 that terminate in end edge 21. Similarly, outer panel 17 has converging lateral edged 22 and 23 that terminate in end edge 24. Borders 25 and 26, fully disclosed in FIG. 4, are fastened along the lateral sides of base panel 16 and extend from front flange 27 nearly to rear flange 28. The lateral sides of intermediate panel 18 rest on borders 25 and 26. Hook and loop fastener 29 attaches the distal area of outer panel 17 to the face of intermediate panel 18. Prong paper fastener 30 secures retaining flange 31 to base panel 16. Staples 32 are applied near fold line 13 to secure retaining flange 31 to borders 25 and 26.

Figure 2:
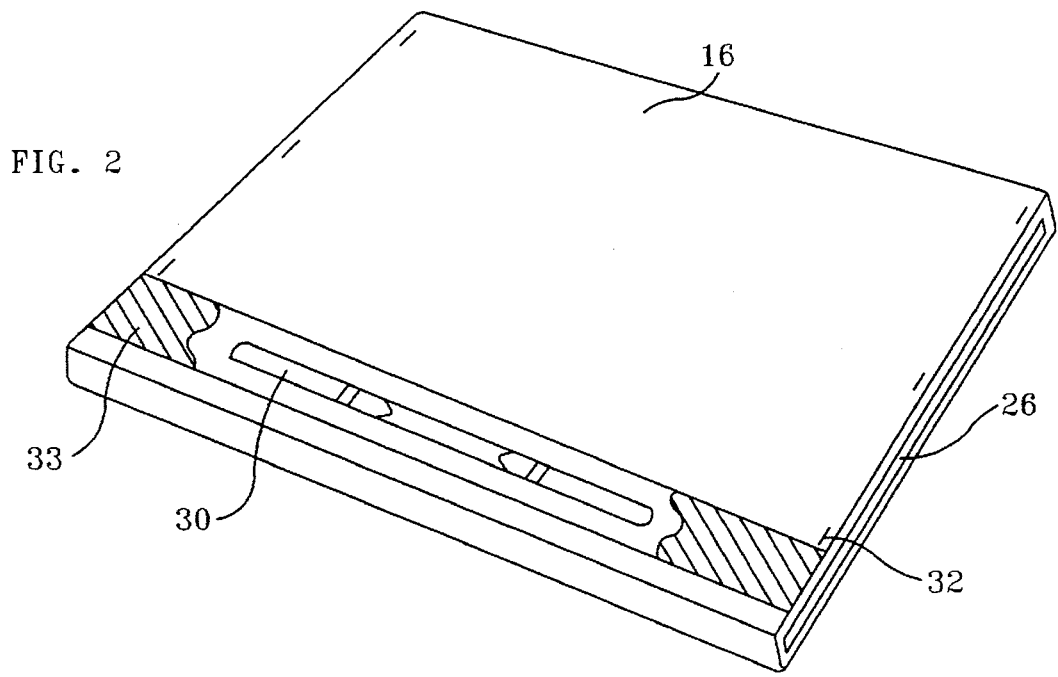
FIG. 2 is a perspective view of the bottom of the container in a collapsed or folded condition.

A cut away drawing in FIG. 2 discloses that prong paper fastener 30 is covered by a section of tape 33 that extends horizontally across the underside of base panel 16. Staples 32 are applied near the lateral edged of base panel 16 to secure borders 25 and 26.

Figure 3:
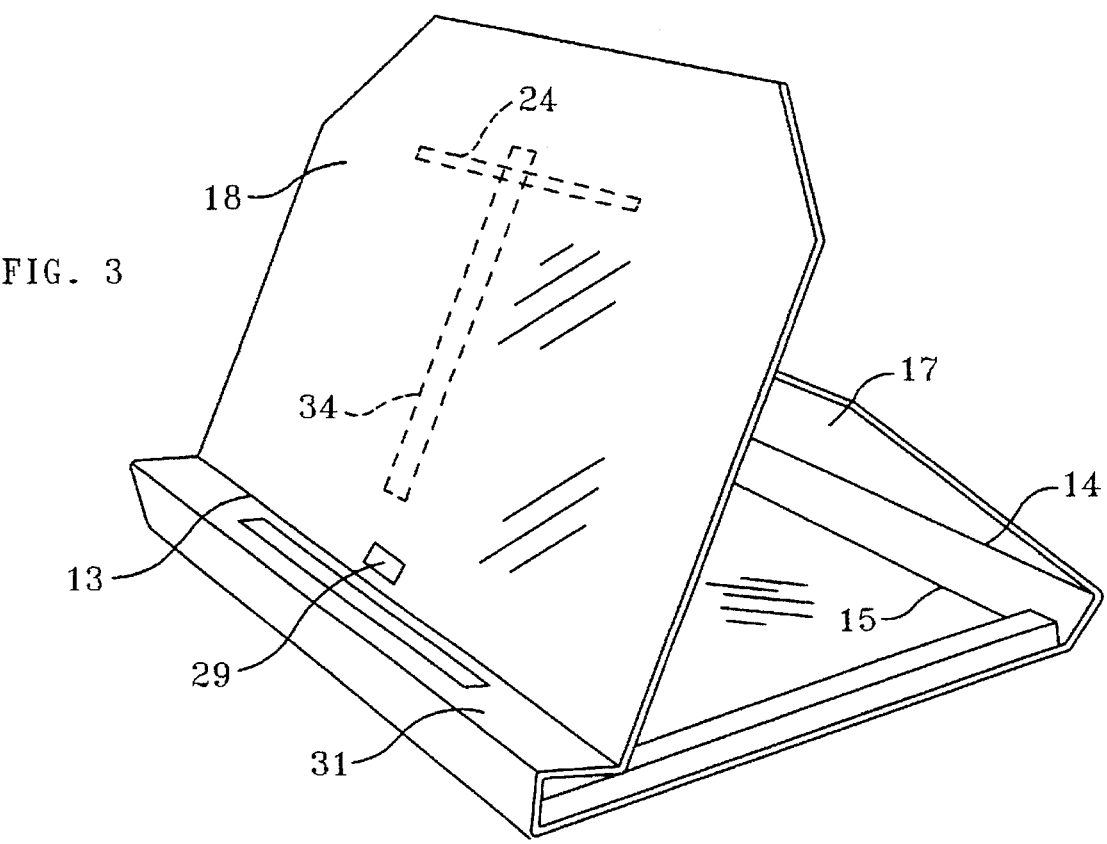
FIG. 3 is a perspective view of the container after the outer and intermediate panels have been raised and placed in the display stand configuration.

FIG. 3 illustrates the result of outer panel 17 being detached from intermediate panel 18 with the release of hook and loop fastener 29. Outer panel 17 has been swung up pivotally from fold lines 14 and 15. Simultaneously, intermediate panel 18 has been swung up pivotally from fold line 13. The display stand configuration is thus assumed with the underside of intermediate panel 18 inclined against end edge 24.

FIG. 4 discloses a more specific illustration of a strip of coarse surface tape 34 applied to the underside of intermediate panel 18 to the general area where intermediate panel 18 and end edge 24 converge. Also shown are spacers 35 and 36 that encircle a portion of the prongs of prong paper fastener 30.

Operation—FIGS. 1 to 4

The present invention has two embodiments and functions. FIG. 1 illustrates that as a portable container, loose leaf papers, workbooks, and other like materials are enclosed when outer panel 17 and intermediate panel 18 collapse into substantially overlapping positions. Base panel 16 is the bottom of the enclosure. The sides are formed with borders 25 and 26, rear flange 28 and spacers 35 and 36.

FIG. 2 illustrates tape 33 which is applied to base panel 16 and covers the compressor side of prong paper fastener 30. This is done to help secure the positioning of prong paper fastener 30 and to keep it from scratching or snagging on other surfaces.

The operation of the second embodiment, that of a display stand, is illustrated in FIGS. 3 and 4. Conversion to the display stand embodiment, as alluded to above, is achieved rather simply by releasing hook and loop fastener 29 and swinging outer panel 17 up from fold lines 14 and 15. Simultaneously, intermediate panel 18 is swung up from fold line 13. End edge 24 then rests on the underside of intermediate panel 18. Coarse surface tape 34, which extends vertically on the underside of intermediate panel 18, enables intermediate panel 18 and end edge 24 to effectively maintain their positions. To change the slope for intermediate panel 18, a simple up or down shift of end edge 24 along coarse surface tape 34 is all that is necessary. Materials to be displayed are placed on retaining flange 31 which serves as a ledge to prevent downward sliding. The materials are further supported by intermediate panel 18.

Summary, Ramifications, and Scope

Accordingly, the reader will see that the combination portable container and display stand can be utilized to carry, store, and display materials easily and conveniently. Specifically, it has additional advantages in that it provides a secure means for storing, transporting, and displaying a wide range of materials;

when in a collapsed or folded condition, it has overall dimensions that allow it to easily fit into a briefcase, portfolio, or backpack of standard moderate size;

it further provides for easy transport by being lightweight;

it is constructed in such a way as to endure extended normal use;

it readily converts to a display stand; and it provides a means for displaying materials at varying inclinations.

It is to be understood that the present invention is not limited in it's application to the details of construction and to the arrangement of the components that have been set forth in the description or illustrated in the drawings. The invention is capable of other embodiments and of being practiced and carried out in various ways. Also, it is to be understood that the descriptions and specificities contained herein should not be regarded as limiting the scope of the invention. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

What is claimed is:

1. A combined portable container and display stand comprising:

(a) an elongated sheet of rigid material having a plurality of transverse fold lines which define a plurality of planar sections hingedly connected to each other to facilitate folding said sheet, wherein said planar sections further define a base panel, an intermediate panel, an outer panel, a front flange, a rear flange and a retaining flange;

(b) said planar sections having substantially parallel lateral edges;

(c) said base panel, said intermediate panel and said outer panel in an overlapping relationship when in a collapsed condition;

(d) said intermediate panel and said retaining flange in an adjacent and substantially coplanar relationship when in a collapsed condition;

(e) fastener means for fastening said retaining flange to said base panel to stabilize said retaining flange when said intermediate panel is actuated;

(f) spacer means attached to said fastener means between said retaining flange and said base panel for fixing the distance between said retaining flange and said base panel;

(g) lateral side means attached to said base panel for forming a container cavity in combination with said rear flange, said spacer means, said intermediate panel and said base panel; and (h) friction means on said intermediate panel for frictionally securing the position of said outer panel against said intermediate panel when said intermediate panel is raised and placed in a display stand condition.

2. A combined portable container and display stand according to claim 1, wherein said elongated sheet is made of cardboard or corrugated paper.

3. A combined portable container and display stand according to claim 1, wherein the total number of said plurality of transverse fold lines is five (5).

4. A combined portable container and display stand according to claim 1, wherein the lateral sides of said outer panel and said intermediate panel are tapered.

5. A combined portable container and display stand according to claim 1, wherein said lateral side means are a pair of wood borders.

6. A combined portable container and display stand according to claim 5, wherein said pair of wood borders are made of particle board.

7. A combined portable container and display stand according to claim 1, wherein said fastener means is a prong paper fastener.

8. A combined portable container and display stand according to claim 1, wherein said lateral side means is attached to said base panel by staples and transfer tape.

9. A combined portable container and display stand according to claim 1, wherein said friction means is coarse surface tape.

10. A combined portable container and display stand comprising:

(a) a substantially rectangular sheet of flat rigid material having substantially parallel lateral edges and a plurality of transverse fold lines, wherein said plurality of transverse fold lines form a plurality of planar sections hingedly connected to each other;

(b) said plurality of planar sections defining a base panel, an intermediate panel, an outer panel, a rear flange, a front flange and a retaining flange;

(c) fastener means for fastening said retaining flange to said base panel;

(d) spacer means disposed between said retaining flange and said base panel for fixing the distance between said retaining flange and said base panel;

(e) lateral side means attached to said base panel for forming a container cavity in combination with said base panel, said spacer means, said rear flange, and said intermediate panel; and (f) friction means for frictionally maintaining the relative positions of said outer panel and said intermediate panel when said intermediate panel is raised and placed in a display stand condition.

11. A combined portable container and display stand according to claim 10, wherein said sheet is made of cardboard or corrugated paper.

12. A combined portable container and display stand according to claim 10, wherein said outer panel, said intermediate panel and said base panel are in an overlapping relationship when in a collapsed condition.

13. A combined portable container and display stand according to claim 10, wherein the total number of said plurality of transverse fold lines is five (5).

14. A combined portable container and display stand according to claim 10, wherein said lateral side means are a pair of wood borders.

15. A combined portable container and display stand according to claim 14, wherein said pair of wood borders are made of particle board.

16. A combined portable container and display stand according to claim 10, wherein said fastener means is a prong paper fastener.

17. A combined portable container and display stand according to claim 10, wherein said friction means is paper or tape material having a coarse surface.

18. A combined portable container and display stand according to claim 10, wherein said outer panel and said intermediate panel have tapered lateral sides.

19. A combined portable container and display stand according to claim 10, wherein said later side means is fixedly secured to said retaining flange and said base panel with staples and transfer tape.

20. A combined portable container and display stand comprising:

(a) an elongated sheet of substantially rigid material having a plurality of transverse fold lines in spaced apart relation defining a plurality of substantially planar sections hingedly connected to each other, wherein said plurality of substantially planar sections form an outer panel, a rear flange, a base panel, a front flange, a retaining flange and an intermediate panel, wherein said base panel, said intermediate panel and said outer panel are in a substantially overlapping relationship when folded;

(b) spacer means between said retaining flange and said base flange for maintaining a fixed distance between said retaining flange and said base flange; and (c) lateral side means attached to said base panel for forming a container cavity in combination with said base panel, said spacer means, said rear flange and said intermediate flange.

* * * * *